No. 789,299. PATENTED MAY 9, 1905.
T. SUZUKI.
APPARATUS FOR BREWING SOY.
APPLICATION FILED JULY 5, 1904.
2 SHEETS—SHEET 1.
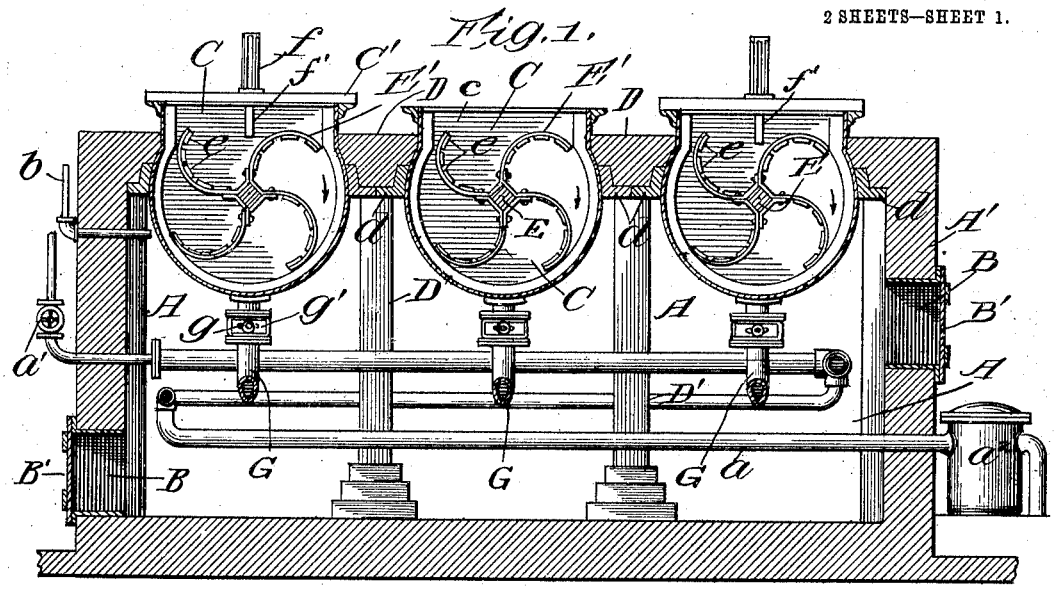
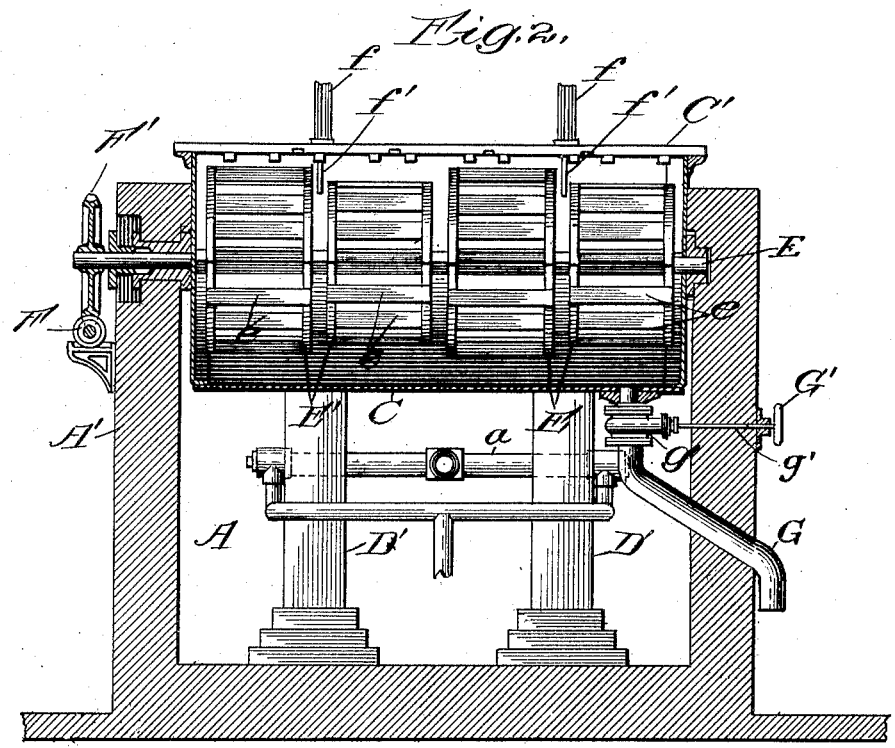

No. 789,299. PATENTED MAY 9, 1905.
T. SUZUKI.
APPARATUS FOR BREWING SOY.
APPLICATION FILED JULY 5, 1904.
2 SHEETS—SHEET 2.
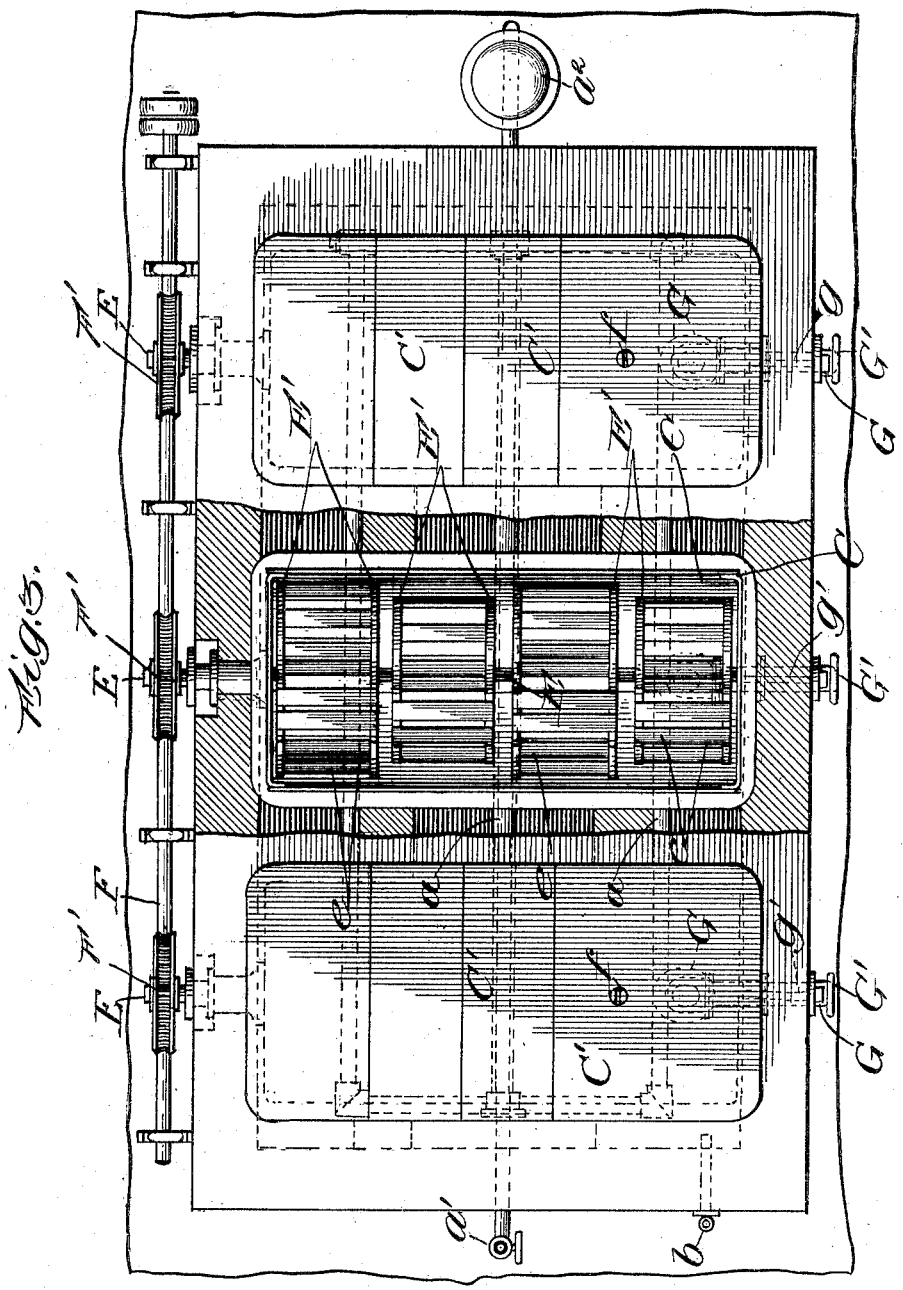

No. 789,299. Patented May 9, 1905.

UNITED STATES PATENT OFFICE.

TOZABURO SUZUKI, OF SUNAMURA, JAPAN.

APPARATUS FOR BREWING SOY.

SPECIFICATION forming part of Letters Patent No. 789,299, dated May 9, 1905.

Application filed July 5, 1904. Serial No. 215,381.

*To all whom it may concern:*

Be it known that I, TOZABURO SUZUKI, a subject of the Emperor of Japan, residing at Sunamura, Prefecture of Tokio, Empire of Japan, have invented certain new and useful Improvements in Apparatus for Brewing Soy, of which the following is a specification.

Attempts have been made recently to brew soy in a shorter time and easier way than in the process hitherto in vogue. In some cases the plan adopted was to raise the temperature of the entire brewing-room; but this was not a success on account of constant fluctuations in temperature caused by the entry and exit of operators and employees. In other cases steam-heated coils were run through the mash-tanks; but this was also a failure, for the reason that while the mash in direct contact with the coils was heated to excess it was impossible to give moderate, equal, and uniform temperature to the entire contents of the tank.

In my invention I prepare the mash originally with a less amount of salt than heretofore has been the custom and subject it to slow and uninterrupted stirring in tanks or receptacles exposed to moderate external heat from a closed heating-chamber, so as to keep the mash at a constant and uniform temperature until the fermentation is thoroughly completed. Then more salt is added to regulate the quality of the soy, the object being to obviate defects, including those above enumerated, in the methods of brewing heretofore employed, to accelerate the maturing of the soy, and to manufacture the largest possible quantity in a shorter time and in all seasons and conditions of weather.

In the drawings, Figure 1 is a longitudinal sectional elevation of apparatus embodying my invention, the tank-covers, however, being unsectioned. Fig. 2 is a transverse sectional elevation, except that the tank-cover is not sectioned; and Fig. 3 is a top plan view, partly broken away and with the cover of the central tank removed to expose the stirrers within.

A represents a closed heat-chamber having thick masonry walls A' and which is kept at a practically constant temperature of 20° to 30° centigrade by suitable means—for example, by steam, hot water, or heated air introduced through the convoluted pipe $a$, provided with regulating-valve $a'$ in the discharge branch, the receiving branch, in case steam is used, connecting with steam-trap $a$ outside the chamber. A ventilation port or ports B, closed by door B', is cut through the wall of the chamber, through which cool air may be admitted into the room, if thermometer $b$, connected with said chamber, shows it to be necessary or if the heating period has passed.

The cylindrical tanks C are open at the top and are advisably fitted with removable covers C', said tanks being laid horizontally in the mason-work above the heating-chamber, parallel with each other where there are more than one, and so as to expose practically all of the body holding the charge to the heat-rays therein. The intervals between the tanks are filled in with concrete or mason-work D, laid in metal troughs $d$, supported upon columns D', as shown. Centrally through each tank passes a stirrer-shaft E, which is provided with stirrer-arms E', preferably curved forward in the direction of rotation and each pair connected by spaced slats $e$, so as to form a series of sets of stirrer-wings separated from each other by short intervals, the wings of one set lagging behind those of the next adjacent set. It will be noted by reference to Fig. 2 that each stirrer comprises a plurality of pairs of stirring-arms E', connected by transverse stirring-slats $e$, and that each stirrer is also separated from its adjacent stirrer and from the ends of the tank C by short intervals of space. The stirrers are shown arranged in pairs, one pair having a greater diametrical sweep than the other pair, the large and small stirrers being arranged upon the shafts adjacent each other. I preferably mount each pair—or, in other words, each alternate stirrer—upon the shaft so that its arms and slats are in alinement with those of its companion stirrer, which is of like size. The remaining pair of stirrers are also arranged so that their arms and slats are in alinement, but out of alinement with the arms and slats of the firstmentioned pair of stirrers. Thus while the arm E' of one stirrer occupies a lowermost position the arms of the next adjacent stirrer will occupy intermediate positions. By means of this arrangement a very effective and desirable agitation of the soy is secured, whereas if all of the slats and stirring-arms of all of the stirrers were arranged in alinement the material would not be moderately agitated, but would be violently thrown about in a containing-cylinder C, whereas in the present construction the soy mixture is gently thrust from before one stirrer laterally directly into the paths of the next adjacent stirrers and back again. This feature of the invention does not consist in providing arms or stirrers that merely pass through the soy mixture, leaving the soy in substantially the same position in the tank at all times, but it consists in providing stirrers capable of effecting a continuous back-and-forth movement of the soy longitudinally of the tank, so that one portion of the mixture being momentarily on top will in the next moment be below. This arrangement secures uniform exposure of all of the contents of the tank to the air-supply. Owing to the arrangement and construction of these wings the mash is scooped up from the bottom and delivered upon the surface, while a continuous flow is caused from one end of the tank to the other and back again, resulting in a thorough exposure of every particle to the oxygen of the air. The stirrer-shafts are revolved slowly by means of worm-shaft F and worm-wheels F', arranged alongside and to the exterior of one lateral wall of the heating-chamber. Thermometers $f$ are provided, entering the tanks in any convenient way—as, for instance, through the covers—so that the temperature may be taken, and a nipple $f'$ may also be provided, whereby pasteurized air may be introduced into the closed tank. The covers being removable may be taken off in dry weather, but replaced in wet weather or whenever it is desired to introduce pasteurized air.

The base of each tank is provided with a draw-off pipe G, having stop-cock $g$, which may be manipulated by stem $g'$ and hand-wheel G' at the exterior of the heating-chamber.

The process for which the apparatus is adapted is made the subject of an independent application filed concurrently herewith, Serial No. 215,382, and no claim is made to it herein.

Having thus described my invention, what I claim, and desire to secure by Letters Patent, is—

1. The combination with a closed heating-chamber provided with ventilating-ports, doors for said ports, heating-coils for said chamber, one or more brewing-tanks sunk within said chamber, draw-off pipes connected with said tanks, and passing outwardly through the wall of said chamber, controlling-valves for said pipes, stirring-shafts passing centrally through said tanks, a plurality of stirrers mounted on said shafts, each stirrer comprising a plurality of pairs of radial stirring-arms connected by transverse stirring-slats, the arms of adjacent stirrers being of different radial lengths, the stirrers being separated from each other and the tank by relatively short intervals of space and arranged upon the shafts to bring the arms and slats of adjacent stirrers out of alinement thereby serving alternately to thrust the soy from the path of one stirrer laterally into the paths of adjacent stirrers.

2. The combination with a closed heating-chamber, means for regulating the temperature of said chamber, one or more brewing-tanks sunk in said chamber, stirring-shafts passing centrally through said tanks, a plurality of stirrers mounted on said shafts, each stirrer comprising a plurality of pairs of radial stirring-arms connected by transverse stirring-slats, the arms of adjacent stirrers being of different radial lengths, the stirrers being separated from each other by relatively short intervals of space, and arranged upon the shafts to bring the arms and slats of adjacent stirrers out of alinement thereby serving to alternately thrust the soy from the path of one stirrer laterally into the paths of adjacent stirrers.

3. The combination with a closed heating-chamber, means for regulating the temperature of said chamber, one or more brewing-tanks sunk in said chamber, stirring-shafts passing centrally through said tanks, a plurality of stirrers mounted on said shafts, each stirrer comprising a plurality of pairs of radial stirring-arms connected by transverse slats and arranged upon the shafts to bring the arms and slats of adjacent stirrers out of alinement thereby serving to alternately thrust the soy from the path of one stirrer laterally into the paths of adjacent stirrers.

4. The combination with one or more brewing-tanks, means for applying a constant heat thereto, shafts passing centrally through said tanks, a plurality of stirrers mounted on said shafts, each stirrer comprising a plurality of pairs of radial stirring-arms connected by transverse slats and arranged upon the shafts to bring the arms of adjacent stirrers out of alinement thereby serving to alternately thrust the soy from the path of one stirrer laterally into the paths of adjacent stirrers.

In testimony whereof I affix my signature in presence of two witnesses.

TOZABURO SUZUKI.

Witnesses:
 R. S. MILLER,
 U. ISHIWARA.